United States Patent
Das

(10) Patent No.: US 10,294,556 B2
(45) Date of Patent: May 21, 2019

(54) METALLURGICAL PROCESS WITH NICKEL-CHROMIUM SUPERALLOY

(71) Applicant: United Technologies Corporation, Farmington, CT (US)

(72) Inventor: Gopal Das, Simsbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 399 days.

(21) Appl. No.: 15/200,038

(22) Filed: Jul. 1, 2016

(65) Prior Publication Data

US 2018/0002795 A1   Jan. 4, 2018

(51) Int. Cl.

| | |
|---|---|
| *C22F 1/10* | (2006.01) |
| *B33Y 10/00* | (2015.01) |
| *B33Y 40/00* | (2015.01) |
| *B22F 3/105* | (2006.01) |
| *B22F 3/15* | (2006.01) |
| *B22F 3/24* | (2006.01) |
| *C22C 19/05* | (2006.01) |

(52) U.S. Cl.
CPC .............. *C22F 1/10* (2013.01); *B22F 3/1055* (2013.01); *B22F 3/15* (2013.01); *B22F 3/24* (2013.01); *B33Y 10/00* (2014.12); *B33Y 40/00* (2014.12); *C22C 19/055* (2013.01); *C22C 19/056* (2013.01)

(58) Field of Classification Search
CPC . C22F 1/10; B33Y 10/00; B33Y 40/00; B22F 3/1055; B22F 3/15; B22F 3/24
USPC ......................................................... 419/29
See application file for complete search history.

(56) References Cited

U.S. PATENT DOCUMENTS

| | | | |
|---|---|---|---|
| 2013/0263977 A1 | 10/2013 | Lukas et al. | |
| 2014/0034626 A1 | 2/2014 | Trevor | |
| 2014/0169981 A1 | 6/2014 | Bales et al. | |

FOREIGN PATENT DOCUMENTS

| | | |
|---|---|---|
| EP | 2551040 | 1/2013 |
| WO | 2014120264 | 8/2014 |
| WO | 2015096980 | 7/2015 |
| WO | 2015108599 | 7/2015 |

OTHER PUBLICATIONS

Extended European Search Report for European Application No. 17178958.9 completed Oct. 11, 2017.

Benn, R.C., and Salva, R.P. (2010). Additively manufactured Inconel alloy 718. TMS (The Minerals, Metals, & Materials Society), 2010. pp. 455-469.

Brochure. Special metals. Publication No. SMC-045. Special Metals Corporation. Sep. 2007. pp. 1-28.

*Primary Examiner* — Edward M Johnson

(74) *Attorney, Agent, or Firm* — Carlson, Gaskey & Olds, P.C.

(57) ABSTRACT

A method of metallurgical processing includes, providing a workpiece that has been formed by additive manufacturing of a nickel-chromium based superalloy. The workpiece has an internal porosity and a microstructure with a columnar grain structure and delta phase. The workpiece is then hot isostatically pressed to reduce the internal porosity and to at least partially retain the columnar grain structure and the delta phase. The workpiece is then heat treated to at least partially retain the columnar grain structure and the delta phase.

16 Claims, 6 Drawing Sheets

METALLURGICAL PROCESS WITH NICKEL-CHROMIUM SUPERALLOY

BACKGROUND

The class of nickel-chromium based superalloys generally has good strength and corrosion resistance. However, strength properties of this class of superalloy, such as ultimate strength, fatigue strength and creep strength, are sensitive to how the superalloy is processed to form an end-use component. Some types of articles require high ultimate, fatigue, and creep strength. Such articles may be cast from the superalloy and subsequently heat treated to develop a microstructure that yields high strength properties. However, while the technique of casting and heat treating can produce a microstructure that yields acceptable properties, processing techniques other than casting may introduce different heat history and thus a different microstructure that may yield unacceptable properties.

SUMMARY

A method of metallurgical processing according to an example of the present disclosure includes providing a workpiece that has been formed by additive manufacturing of a nickel-chromium based superalloy. The workpiece has an internal porosity and a microstructure with a columnar grain structure and delta phase. The workpiece is hot isostatically pressed to reduce the internal porosity and to at least partially retain the columnar grain structure and the delta phase. After the hot isostatic pressing, the workpiece is heat treated to at least partially retain the columnar grain structure and the delta phase.

In a further embodiment of any of the foregoing embodiments, the hot isostatic pressing of the workpiece forms new delta phase at grain boundaries in the columnar grain structure, and the heat treating of the workpiece after the hot isostatic pressing forms additional new delta phase at grain boundaries in the columnar grain structure.

In a further embodiment of any of the foregoing embodiments, the nickel-chromium based superalloy has a composition including, by weight: 50-55% Ni+Co, 17-21% Cr, 4.74-5.5% Nb+Ta, 2.8-3.3% Mo, 0.65-1.15 Ti, 0.2-0.8 Al, and a balance Fe and impurities.

In a further embodiment of any of the foregoing embodiments, the workpiece has a geometry of an aerospace component.

In a further embodiment of any of the foregoing embodiments, the hot isostatic pressing reduces the internal porosity by a relative percentage of least 40%.

In a further embodiment of any of the foregoing embodiments, after the heat treating the workpiece has a yield strength of greater than 120 ksi at both 70° F. and 1200° F.

In a further embodiment of any of the foregoing embodiments, after the heat treating the workpiece has an ultimate tensile strength of greater than 140 ksi at both 70° F. and 1200° F.

In a further embodiment of any of the foregoing embodiments, the hot isostatic pressing includes holding the workpiece under a temperature condition of approximately 1850° F. to approximately 1900° F. and a pressure condition of approximately 15 ksi to approximately 25 ksi.

In a further embodiment of any of the foregoing embodiments, the heat treating includes solution heat treating the workpiece under a temperature condition of approximately 1750° F. to approximately 1850° F., followed by aging the workpiece under one or more aging temperature conditions up to approximately 1400° F.

In a further embodiment of any of the foregoing embodiments, the heat treating also forms intragranular equiaxed grains in the columnar grain structure.

A method of metallurgical processing according to an example of the present disclosure includes forming a workpiece by selectively consolidating a nickel-chromium based superalloy powder under a vacuum environment, layer-by-layer, using an electron beam. The workpiece has an internal porosity and a microstructure with a columnar grain structure and delta phase. The workpiece is hot isostatically pressed under a temperature condition of approximately 1850° F. to approximately 1900° F. and a pressure condition of approximately 15 ksi to approximately 25 ksi. After the hot isostatic pressing, the workpiece is solution heat treated under a solution temperature condition of approximately 1750° F. to approximately 1850° F. After the solution heat treating, the workpiece is aged under one or more aging temperature conditions up to approximately 1400° F. After the aging, the workpiece has a columnar grain structure, intragranular delta phase in the columnar grain structure, and delta phase at grain boundaries in the columnar grain structure.

In a further embodiment of any of the foregoing embodiments, the nickel-chromium based superalloy has a composition including, by weight: 50-55% Ni+Co, 17-21% Cr, 4.74-5.5% Nb+Ta, 2.8-3.3% Mo, 0.65-1.15 Ti, 0.2-0.8 Al, and a balance Fe and impurities.

In a further embodiment of any of the foregoing embodiments, the workpiece has a geometry of an aerospace component.

In a further embodiment of any of the foregoing embodiments, the hot isostatic pressing reduces the internal porosity by a relative percentage of least 40%.

In a further embodiment of any of the foregoing embodiments, after the aging the workpiece has a yield strength of greater than 120 ksi at both 70° F. and 1200° F., and an ultimate tensile strength of greater than 140 ksi at both 70° F. and 1200° F.

In a further embodiment of any of the foregoing embodiments, after the aging the workpiece has an intragranular equiaxed grains in the columnar grain structure.

A superalloy article according to an example of the present disclosure includes an additively manufactured component formed of a nickel-chromium superalloy having an internal porosity, by volume, of less than 0.6% and a microstructure with a columnar grain structure, intragranular delta phase in the columnar grain structure, and delta phase at grain boundaries in the columnar grain structure.

In a further embodiment of any of the foregoing embodiments, the nickel-chromium based superalloy has a composition including, by weight: 50-55% Ni+Co, 17-21% Cr, 4.74-5.5% Nb+Ta, 2.8-3.3% Mo, 0.65-1.15 Ti, 0.2-0.8 Al, and a balance Fe and impurities.

In a further embodiment of any of the foregoing embodiments, the internal porosity is 0.5% or less.

In a further embodiment of any of the foregoing embodiments, the microstructure has intragranular equiaxed grains in the columnar grain structure.

In a further embodiment of any of the foregoing embodiments, the intragranular equiaxed grains have an average size of 5 micrometers.

In a further embodiment of any of the foregoing embodiments, the article is an aerospace article.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

When a superalloy powder is processed under a vacuum condition (i.e., below standard atmospheric pressure) in an additive manufacturing process, the powder processing introduces porosity. The porosity can potentially debit properties, such as fatigue strength, and is often not acceptable in the end-use component. Furthermore, under similar heat treating conditions as for a casting, the microstructure that results from the powder processing leads to a final microstructure that does not have the desired high strength properties.

Figure 1:
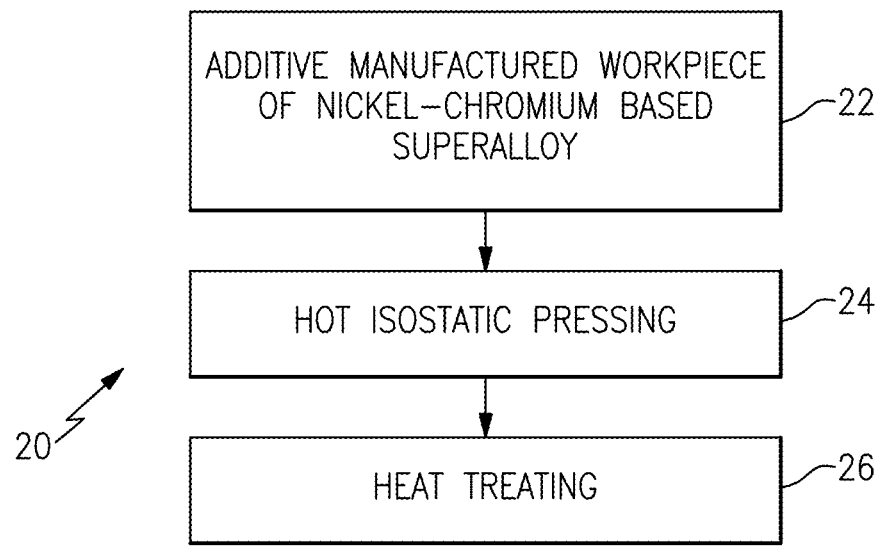
FIG. 1 illustrates an example method of metallurgical processing.

FIG. 1 schematically illustrates an example method 20 of metallurgical processing of a nickel-chromium based superalloy. The method 20 provides a metallurgical process for a workpiece that is formed by powder additive manufacturing and which can yield higher strength properties. As shown, the method 20 generally includes steps 22, 24, and 26. Turning first to step 22, a workpiece is provided that has been formed by additive manufacturing of a nickel-chromium based superalloy. For example, the nickel-chromium based superalloy has a composition including, by weight: 50-55% Ni+Co, 17-21% Cr, 4.74-5.5% Nb+Ta, 2.8-3.3% Mo, 0.65-1.15 Ti, 0.2-0.8 Al, and a balance Fe and impurities. An example nickel-chromium based superalloy is known as INCONEL® 718 (HUNTINGTON ALLOYS CORPORATION). The provision of the workpiece in step 22 can simply include receiving and having a workpiece that is formed by the additive manufacturing process of the nickel-chromium based superalloy. Alternatively, the provision of the workpiece in step 22 can include forming the workpiece using an additive manufacturing process.

One example additive manufacturing process can include consolidating a powder of the nickel-chromium based superalloy under a vacuum environment. The vacuum environment reduces the potential for the formation of oxides that might otherwise debit the properties of the article. The powder is deposited layer-by-layer in a powder bed, and each layer is selectively consolidated using an electron beam. Electron beam additive manufacturing and process parameters for nickel alloys is generally known and is thus not discussed in further detail herein.

For electron beam additive manufacturing the beam power is typically much higher than for other types of energy beams, such as laser beams. Because of the higher power, a larger average size of powder, which is less costly than smaller sized powders, can be used. In other words, the relatively high power (e.g., 500 Watts) of the electron beam is capable of melting and consolidating the larger sized powder. For example, the powder can have, but is not limited to, an average size of approximately 70 micrometers to approximately 100 micrometers. However, the larger sized powder generally includes a higher level of porosity in the powder particulates in comparison to smaller sized particulates and is also more likely to entrap residual gas that is not able to escape before the melted powder cools and solidifies during the process. Thus, the workpiece formed by electron beam additive manufacturing has a relatively high internal porosity in comparison to cast articles and articles formed by laser additive manufacturing processes using smaller sized powders.

The melting and relatively rapid cooling of the superalloy during the electron beam additive manufacturing process generates a microstructure that has a columnar grain structure. The columnar grain structure includes grains that are elongated along the direction of build during the electron beam additive manufacturing. For example, where the powder layers deposited and selectively consolidated in a vertical fashion, the grains are elongated in the vertical direction. For purposes of directional orientation later in this disclosure, the elongated direction may be referred to as the longitudinal direction and the direction perpendicular to the elongated direction may be referred to as the transverse direction.

The melting and relatively rapid cooling of the superalloy during the electron beam additive manufacturing process also generates delta phase in the columnar grain structure. For the nickel-chromium based superalloy, the delta phase is orthorhombic $Ni_3Nb$ and typically has a needle-like structure. The grains of the columnar grain structure also contain $\gamma'$ (gamma prime) and/or $\gamma''$ (gamma double prime) phases. The $\gamma'$ (gamma prime) phase is face centered cubic $Ni_3Al$ and the $\gamma''$ (gamma double prime) phase is body centered tetragonal $Ni_3Nb$.

After step 22 the workpiece is hot isostatically pressed at step 24 to reduce the internal porosity in the workpiece. In addition to reducing porosity, the hot isostatic pressing is conducted under conditions that at least partially retain the columnar grain structure and the delta phase, and that also form new delta phase at grain boundaries in the columnar grain structure. The term "at least partially retain" or variations thereof refers to a structure or phase that was present before a process step and that is substantially present after the process step, but not necessarily in the same amount or to the same degree. For example, the columnar grain structure is retained, but the size and/or amount of columnar grains may have changed.

After the hot isostatic pressing, the workpiece is heat treated at step 26. The purpose of the heat treatment is to further develop the microstructure to obtain high strength properties. In this regard, the heat treatment is conducted under conditions that at least partially retain the columnar grain structure and the delta phase. The heat treatment also forms additional new delta phase at grain boundaries in the columnar grain structure and may form intragranular equiaxed grains in the columnar grain structure. For example, the heat treatment includes a solution/precipitation heat treatment and an aging heat treatment, examples of which are described below.

The retention of the delta phase and formation of new delta phase through the hot isostatic pressing in step 24 contributes to the ability to obtain high strength properties after the later heat treatment. The delta phase functions to inhibit grain growth during the later heat treatment, thus reducing the potential that the grains will grow to very large grain sizes and reduce the strength properties. However, it is also desirable that the hot isostatic pressing at step 24 be conducted at conditions that avoid generating too much new delta phase. The new delta phase may be at least partially retained through the later heat treatment. If retained, the end article may have high levels of delta phase that debit strength properties.

In one example, the hot isostatic pressing of step 24 is conducted at holding the workpiece under a temperature condition of approximately 1850° F. to approximately 1900° F. in a pressure condition of approximately 15 ksi to approximately 25 ksi. The hold time is typically approximately 4 hours, but may be varied by twenty-five minutes (longer or shorter).

The heat treating of step 26 can include a solution heat treatment and an aging heat treatment. For example, the solution heat treatment includes holding the workpiece under a solution temperature condition of approximately 1750° F. to approximately 1850° F. for approximately 8 hours. The aging heat treatment can be conducted by holding the workpiece under one or more aging temperature conditions up to approximately 1400° F. For example, the aging heat treatment can include initially holding the workpiece at a first, relatively high aging temperature condition followed by holding the workpiece at a relatively lower aging temperature condition. In one example, the higher aging temperature condition is approximately 1300° F. to approximately 1400° F. and the lower aging temperature condition is approximately 1100° F. to approximately 1200° F.

Figure 2A:
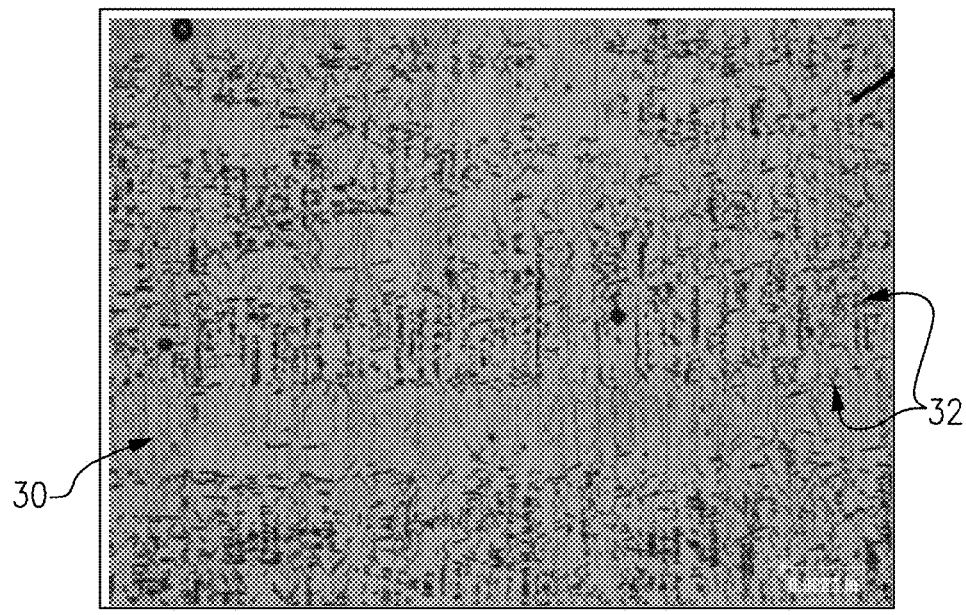
FIG. 2A illustrates a cross-section of a workpiece microstructure after fabrication by electron beam additive manufacturing, taken along a longitudinal direction.
Figure 2B:
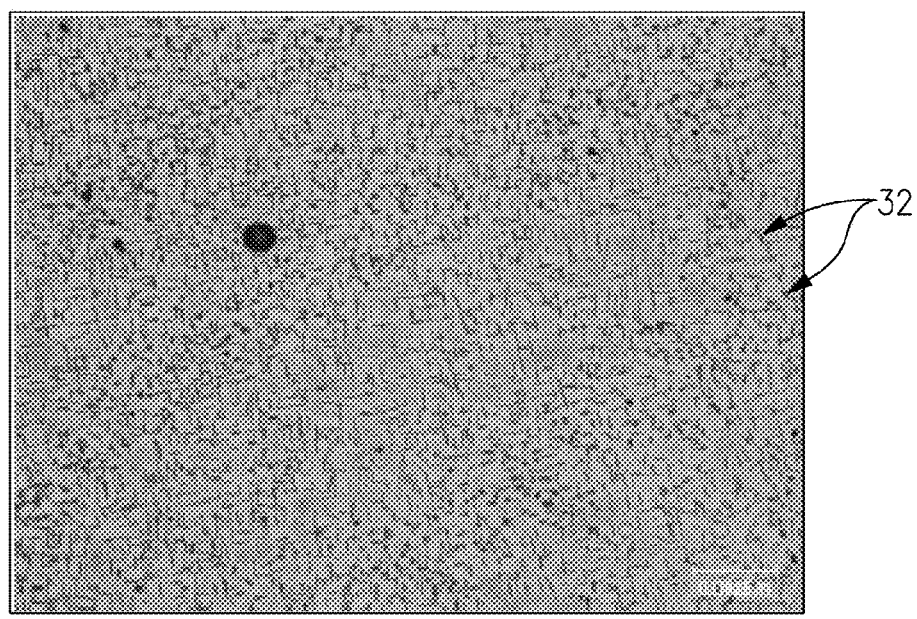
FIG. 2B illustrates a cross-section of a workpiece microstructure after fabrication by electron beam additive manufacturing, taken along a transverse direction.

FIGS. 2A and 2B illustrate cross-sections of a workpiece after electron beam additive manufacturing but before hot isostatic pressing. The cross-section of FIG. 2A is taken in the longitudinal direction and shows a columnar grain structure 30 with delta phase 32 dispersed in the columnar grain structure 30. The cross-section shown in FIG. 2B is taken in the transverse direction and also shows the delta phase 32.

Figure 3A:
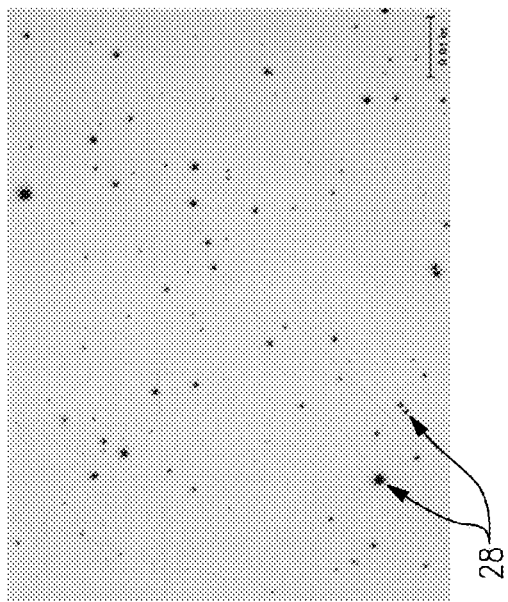
FIG. 3A illustrates a cross-section of a workpiece after fabrication by electron beam additive manufacturing.
Figure 3B:
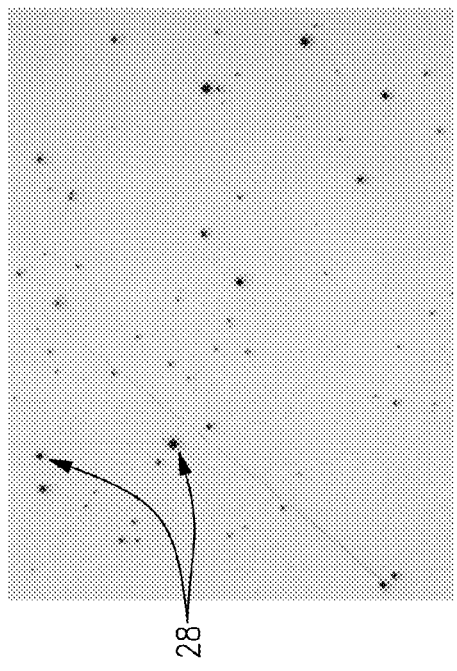
FIG. 3B illustrates a cross-section of a workpiece after hot isostatic pressing at 1850° F.
Figure 3C:
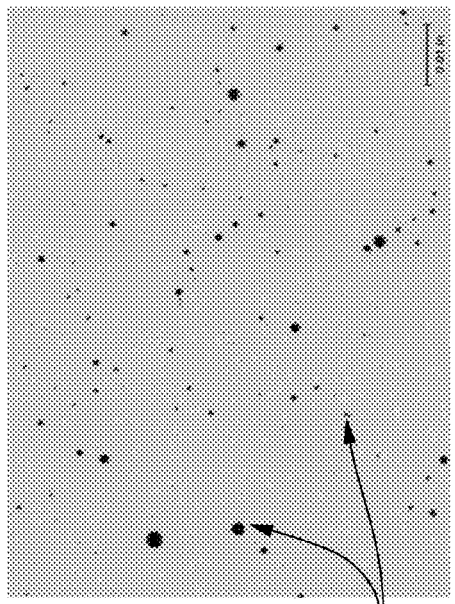
FIG. 3C illustrates a cross-section of a workpiece after hot isostatic at 1900° F.

FIGS. 3A, 3B, and 3C illustrate cross-sections of workpieces at different stages in the method 20. FIG. 3A illustrates a cross-section of a workpiece after electron beam additive manufacturing. As shown, the workpiece contains a relatively high amount of porosity 28, such as greater than 0.6% porosity.

FIG. 3B illustrates a cross-section of a workpiece after the hot isostatic pressing of step 24. The hot isostatic processing reduced the internal porosity 28 by a relative percentage of at least 40%. In this example, the hot isostatic processing was conducted under a temperature condition of approximately 1850° F. and a pressure condition of approximately 25 ksi for approximately 4 hours.

FIG. 3C illustrates another cross-section of a workpiece after hot isostatic processing. Again, the hot isostatic processing reduced the internal porosity. In this example, the hot isostatic processing was conducted under a temperature condition of approximately 1900° F. and a pressure condition of approximately 20 ksi for a time of approximately 4 hours.

Figure 4A:
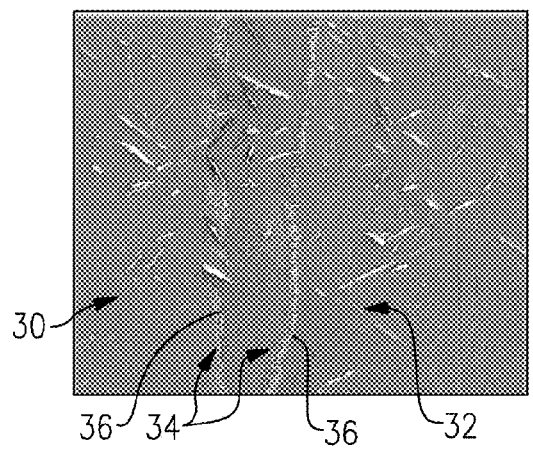
FIG. 4A illustrates a cross-section after hot isostatic pressing at 1850° F.

FIG. 4A shows a cross-section of a workpiece after hot isostatic processing under a temperature condition of approximately 1850° F. and a pressure condition of approximately 25 ksi for a time of approximately 4 hours. As shown, the workpiece at least partially retained the columnar grain structure 30 and at least some of the delta phase 32 that was present prior to the hot isostatic pressing. At grain boundaries 34 the workpiece includes new delta phase 36 that is smaller/finer than the delta phase 32 originally present prior to the hot isostatic pressing.

Figure 4B:
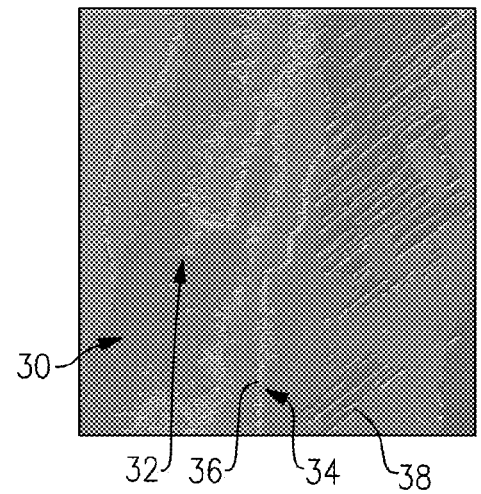
FIG. 4B illustrates a cross-section after hot isostatic pressing at 1850° F. and solution/precipitation aging treatment.

FIG. 4B shows a cross-section of a workpiece after solution/precipitation heat treating and aging according to step 26. In this example, the workpiece was previously hot isostatically pressed under a temperature condition of approximately 1850° F. and a pressure condition of approximately 25 ksi for approximately 4 hours. As shown, the workpiece has still retained the columnar microstructure 30, at least some of the delta phase 32 that was present after the hot isostatic pressing, and the new delta phase 36 that developed at the grain boundaries 34 from the hot isostatic pressing. However, the workpiece now also includes intragranular equaxed grins 38 in the columnar grain structure 30.

Figure 5A:
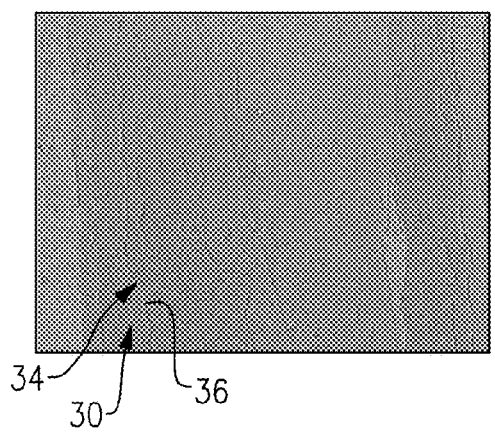
FIG. 5A illustrates a cross-section after hot isostatic pressing at 1900° F.

FIG. 5A illustrates a cross-section of another workpiece after hot isostatic pressing. In this example, the workpiece was hot isostatically pressed under a temperature condition of approximately 1900° F. and a pressure condition of approximately 20 ksi for approximately 4 hours. In this example, the microstructure is more refined than the microstructure of the workpiece in FIG. 4A in that there is less delta phase 32 that was present before the hot isostatic pressing. However, the new delta phase 36 was formed at the grain boundaries 34 in the columnar grain structure 30.

Figure 5B:
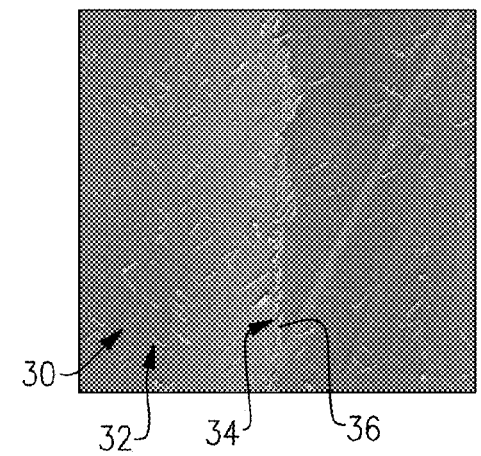
FIG. 5B illustrates a cross-section after hot isostatic processing at 1900° F. and solution/precipitation and aging treatment.
Figure 5C:
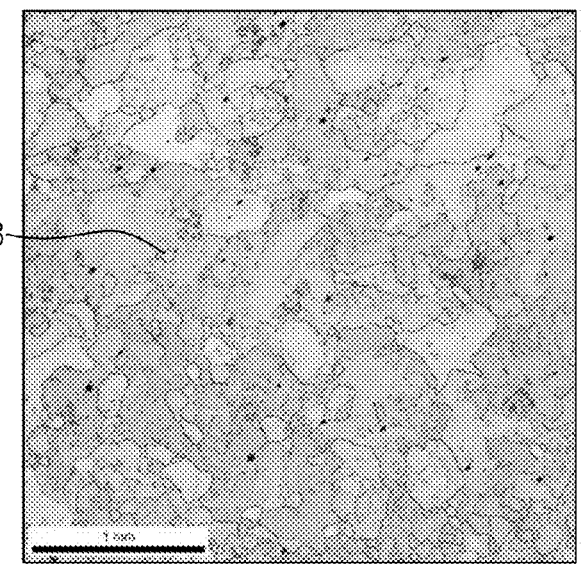
FIG. 5C illustrates a cross-section taken in a transverse direction after hot isostatic pressing at 1900° F. and solution/precipitation and aging treatment.

FIG. 5B shows a longitudinal cross-section of another example workpiece after solution/precipitation and aging treatments, and FIG. 5C shows a transverse cross-section of the workpiece. Again, the microstructure has at least partially retained the columnar grain structure 30 and at least some of the previously present delta phase 32, along with forming new delta phase 36 at the grain boundaries 34. As shown in FIG. 5C, intragranular equiaxed grains 38 may also have formed in the columnar grain structure 30.

Figure 6A:
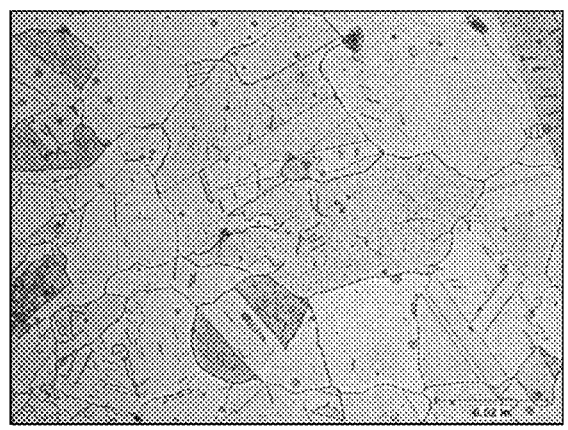
FIG. 6A illustrates a cross-section taken in a longitudinal direction after hot isostatic pressing at 2125° F.
Figure 6B:
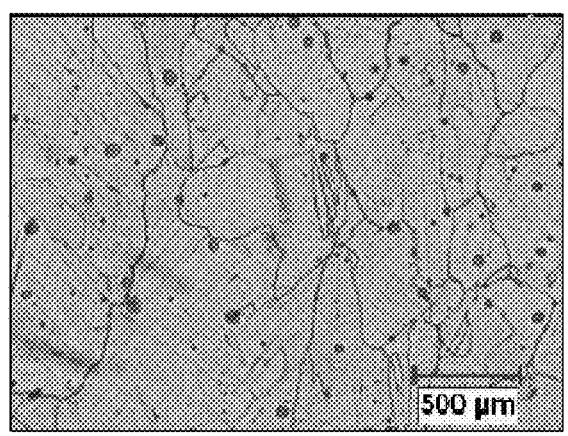
FIG. 6B illustrates a cross-section after hot isostatic pressing at 2125° F. and solution/precipitation and aging treatment.

For comparison, FIG. 6A shows a longitudinal cross-section of a workpiece after hot isostatic pressing at a temperature condition of 2125° F. and a pressure condition of 15 ksi for 4 hours. FIG. 6B shows a longitudinal cross-section of the workpiece after solution/precipitation treatment and aging. As shown, the columnar grain structure has not been retained, and instead, new large-sized grains have developed. For example, the microstructure has an average size of approximately 300 micrometers after the aging treatment. As a result, the strength properties of the workpiece processed at this higher hot isostatic temperature condition are much lower than for hot isostatic processing at the lower temperature conditions above.

Figure 7A:
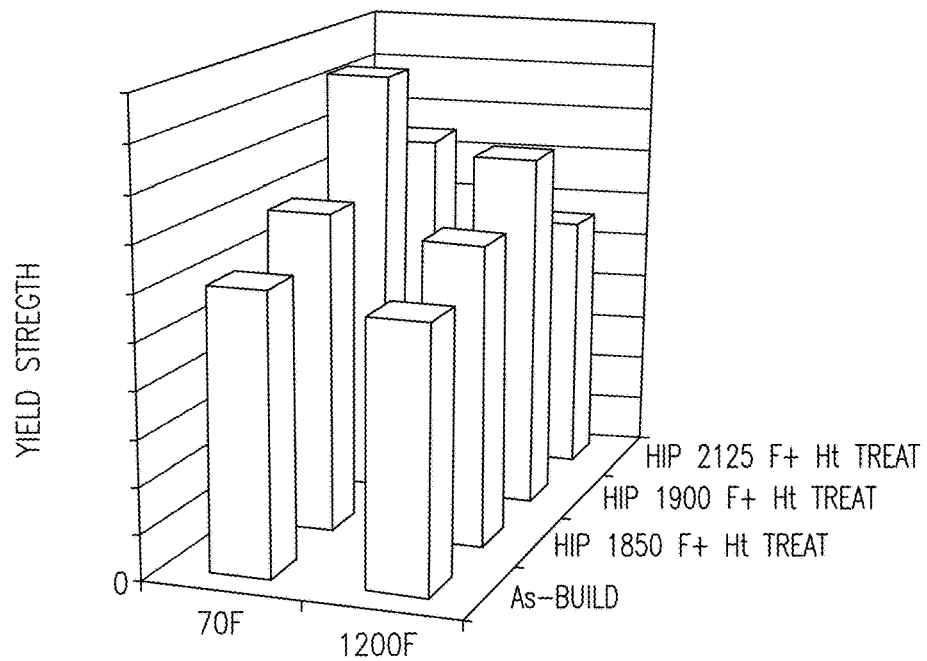
FIG. 7A illustrates a graph of yield strength.
Figure 7B:
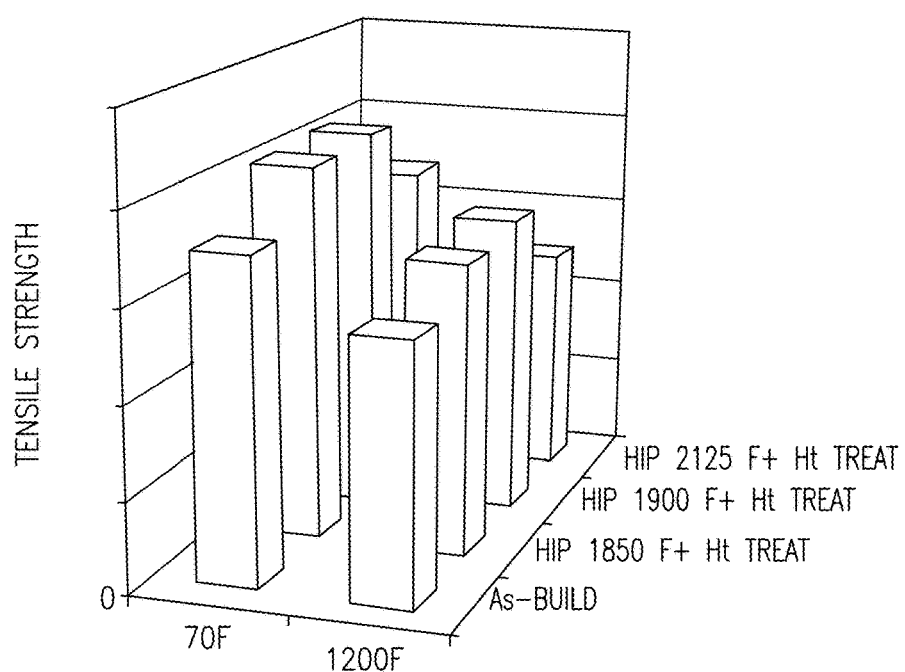
FIG. 7B illustrates a graph of ultimate tensile strength.

FIGS. 7A and 7B show relative strength data for workpieces "as-built" (after electron beam additive manufacturing), after hot isostatic pressing at 1850° F.+solution/precipitation and aging treatment, after hot isostatic pressing at 1900° F.+solution/precipitation and aging treatment, and after hot isostatic pressing at 2125° F.+solution/precipitation and aging treatment.

FIG. 7A shows yield strength at 70° F. and 1200° F. Hot isostatic pressing at the highest temperature of 2125° F. under the same heat treatment as the other samples provides little or no additional increase in strength versus the strength of the workpieces after only additive manufacturing. In contrast, hot isostatic pressing at the lower temperatures of 1850° F. or 1900° F. increases yield strength beyond what is achieved at the higher temperature of 2125° F.

FIG. 7B shows a similar trend for ultimate tensile strength at 70° F. and 1200° F. Hot isostatic pressing at the higher temperature of 2125° F. provides little or no increase in ultimate tensile strength versus the strength of the workpiece after additive manufacturing. In contrast, hot isostatic pressing at the lower temperatures of 1850° F. or 1900° F. provides an increase in ultimate tensile strength. For example, workpieces processed at 1850° F. or 1900° F. have a yield strength of greater than 120 ksi at both 70° F. and 1200° F. and ultimate tensile strength of greater than 140 ksi at both 70° F. and 1200° F.

Figure 8:
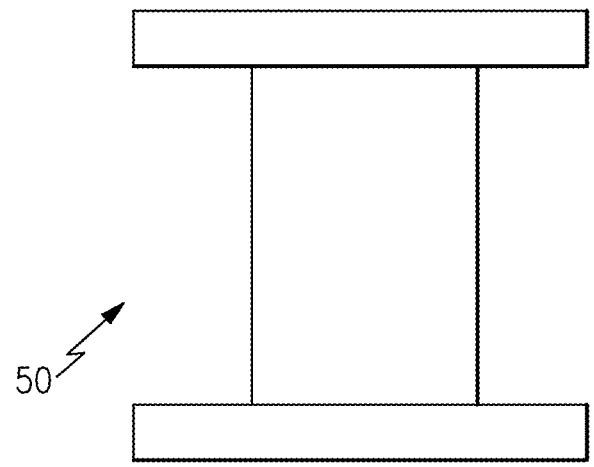
FIG. 8 illustrates an example superalloy article that can be fabricated by the method of FIG. 1.

The resulting microstructure of an article processed according to the method 20 may have characteristics that are similar to the microstructures shown in FIG. 4B, 5B, or 5C. Moreover, the internal porosity, due to the hot isostatic pressing, can be reduced by a relative percentage of least 40%. For example, the porosity can be reduced, by volume, to less than 0.6%. In further examples, the internal porosity may be less than 0.5% or less than 0.3%. FIG. 8 illustrates one example article 50 that may be fabricated using the method 20. In this example, the article 50 is schematically shown as a turbine engine vane. However, it is to be understood that the disclosure is not limited to vanes and that the article may alternatively be fabricated in the form of a blade, seal, or other aerospace article.

The temperatures herein are provided in Fahrenheit and strength values are provided in ksi (kilopounds per square inch). Temperatures given in Fahrenheit are readily convertible to Celsius, and values given in ksi are readily convertible to MPa (megapascals). The table below includes conversions of the temperatures and strength values used herein.

| Value | Units | Converted Value | Units |
|-------|-------|-----------------|-------|
| 2125 | ° F. | 1163 | ° C. |
| 1900 | ° F. | 1038 | ° C. |
| 1850 | ° F. | 1010 | ° C. |
| 1400 | ° F. | 760 | ° C. |
| 1300 | ° F. | 704 | ° C. |
| 1200 | ° F. | 649 | ° C. |
| 1100 | ° F. | 593 | ° C. |
| 70 | ° F. | 21 | ° C. |
| 25 | ksi | 172 | MPa |
| 20 | ksi | 138 | MPa |
| 15 | ksi | 103 | MPa |
| 120 | ksi | 827 | MPa |
| 140 | ksi | 965 | MPa |

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A method of metallurgical processing, the method comprising:
   providing a workpiece that has been formed by additive manufacturing of a nickel-chromium based superalloy, the workpiece having an internal porosity and a microstructure with a columnar grain structure and delta phase;
   hot isostatically pressing the workpiece to reduce the internal porosity and to at least partially retain the columnar grain structure and the delta phase; and
   heat treating the workpiece after the hot isostatic pressing to at least partially retain the columnar grain structure and the delta phase.

2. The method as recited in claim 1, wherein the hot isostatic pressing of the workpiece forms new delta phase at grain boundaries in the columnar grain structure, and the heat treating of the workpiece after the hot isostatic pressing forms additional new delta phase at grain boundaries in the columnar grain structure.

3. The method as recited in claim 1, wherein the nickel-chromium based superalloy has a composition including, by weight: 50-55% Ni+Co, 17-21% Cr, 4.74-5.5% Nb+Ta, 2.8-3.3% Mo, 0.65-1.15 Ti, 0.2-0.8 Al, and a balance Fe and impurities.

4. The method as recited in claim 1, wherein the workpiece has a geometry of an aerospace component.

5. The method as recited in claim 1, wherein the hot isostatic pressing reduces the internal porosity by a relative percentage of least 40%.

6. The method as recited in claim 1, wherein after the heat treating the workpiece has a yield strength of greater than 120 ksi at both 70° F. and 1200° F.

7. The method as recited in claim 1, wherein after the heat treating the workpiece has an ultimate tensile strength of greater than 140 ksi at both 70° F. and 1200° F.

8. The method as recited in claim 1, wherein the hot isostatic pressing includes holding the workpiece under a temperature condition of approximately 1850° F. to approximately 1900° F. and a pressure condition of approximately 15 ksi to approximately 25 ksi.

9. The method as recited in claim 1, wherein the heat treating includes solution heat treating the workpiece under a temperature condition of approximately 1750° F. to approximately 1850° F., followed by aging the workpiece under one or more aging temperature conditions up to approximately 1400° F.

10. The method as recited in claim 1, wherein the heat treating also forms intragranular equiaxed grains in the columnar grain structure.

11. A method of metallurgical processing, the method comprising:
    forming a workpiece by selectively consolidating a nickel-chromium based superalloy powder under a vacuum environment, layer-by-layer, using an electron beam, the workpiece having an internal porosity and a microstructure with a columnar grain structure and delta phase;

hot isostatically pressing the workpiece held under a temperature condition of approximately 1850° F. to approximately 1900° F. and a pressure condition of approximately 15 ksi to approximately 25 ksi;

after the hot isostatic pressing, solution heat treating the workpiece held under a solution temperature condition of approximately 1750° F. to approximately 1850° F.; and after the solution heat treating, aging the workpiece held under one or more aging temperature conditions up to approximately 1400° F., and after the aging the workpiece having a columnar grain structure, intragranular delta phase in the columnar grain structure, and delta phase at grain boundaries in the columnar grain structure.

12. The method as recited in claim 11, wherein the nickel-chromium based superalloy has a composition including, by weight: 50-55% Ni+Co, 17-21% Cr, 4.74-5.5% Nb+Ta, 2.8-3.3% Mo, 0.65-1.15 Ti, 0.2-0.8 Al, and a balance Fe and impurities.

13. The method as recited in claim 11, wherein the workpiece has a geometry of an aerospace component.

14. The method as recited in claim 11, wherein the hot isostatic pressing reduces the internal porosity by a relative percentage of least 40%.

15. The method as recited in claim 11, wherein after the aging the workpiece has a yield strength of greater than 120 ksi at both 70° F. and 1200° F., and an ultimate tensile strength of greater than 140 ksi at both 70° F. and 1200° F.

16. The method as recited in claim 11, wherein after the aging the workpiece has an intragranular equiaxed grains in the columnar grain structure.

* * * * *